US008167968B2

(12) United States Patent
Sato et al.

(10) Patent No.: US 8,167,968 B2
(45) Date of Patent: May 1, 2012

(54) AIR CLEANER HOUSING AND INTAKE SYSTEM FOR AN ENGINE, AND VEHICLE INCORPORATING SAME

(75) Inventors: Masatoshi Sato, Saitama (JP); Masaya Ishiguro, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 317 days.

(21) Appl. No.: 12/584,612

(22) Filed: Sep. 9, 2009

(65) Prior Publication Data

US 2010/0071650 A1 Mar. 25, 2010

(30) Foreign Application Priority Data

Sep. 19, 2008 (JP) ................................. 2008-241662

(51) Int. Cl.
*B01D 46/00* (2006.01)

(52) U.S. Cl. ...................... 55/385.3; 55/503; 123/198 E

(58) Field of Classification Search ................. 55/385.3, 55/350.1, 385.1, 495; 123/198 E; 95/90, 95/135; 96/380, 383, 386, 388
See application file for complete search history.

(56) References Cited

U.S. PATENT DOCUMENTS 2,760,592 A * 8/1956 Sebok .......................... 181/229
6,761,748 B2 * 7/2004 Schenk et al. ............... 55/385.3
7,416,580 B2 * 8/2008 Nyman et al. .................... 95/90
7,753,979 B2 * 7/2010 Amann ........................... 55/413

FOREIGN PATENT DOCUMENTS

JP 62-255565 11/1987
JP 09-032667 2/1997

* cited by examiner

*Primary Examiner* — Duane Smith
*Assistant Examiner* — Minh-Chau Pham
(74) *Attorney, Agent, or Firm* — Carrier Blackman & Associates, P.C.; Joseph P. Carrier; William D. Blackman

(57) ABSTRACT

In a vehicle having an air cleaner for cleaning incoming intake air supplied to an engine, a stepped surface is formed on at least one of a plurality of walls of an air cleaner housing. The stepped surface is formed on an upper wall of the air cleaner housing, such that an outer step is arranged on a periphery of an inner step. The upper wall is formed into a stereoscopic shape by providing the stepped surface thereon, such that the rigidity of the upper wall is enhanced, and a sonic resonance of the upper wall can be suppressed during vehicle operation, thereby reducing intake noises. By providing the stepped surface to the upper wall of the air cleaner for reducing intake noises, and it is unnecessary to add one or more extra components to the air cleaner for reducing intake noises.

20 Claims, 10 Drawing Sheets

FIG. 5A
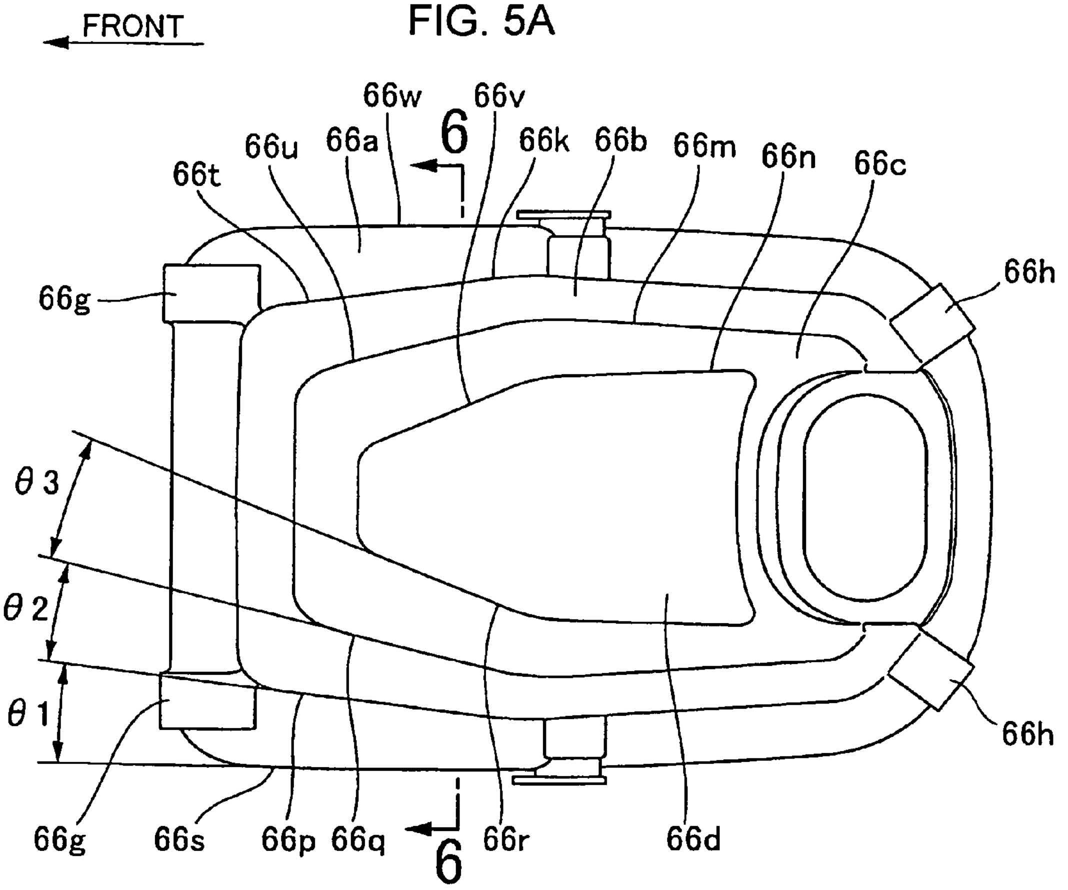
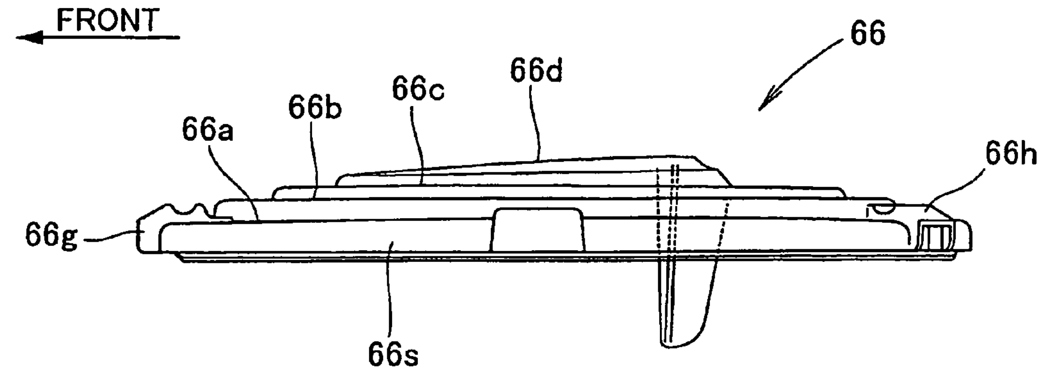
FIG. 5B

FRONT

AIR CLEANER HOUSING AND INTAKE SYSTEM FOR AN ENGINE, AND VEHICLE INCORPORATING SAME

CROSS-REFERENCE TO RELATED APPLICATIONS

The present invention claims priority under 35 USC 119 based on Japanese patent application No. 2008-241662, filed on Sep. 19, 2008. The entire subject matter of this priority document, including the specification, claims and drawings thereof, is incorporated by reference herein.

BACKGROUND OF THE INVENTION

1. Field of the Invention

The present invention relates to an improved intake system for an engine of a vehicle, to an air cleaner housing which is a component of the intake system, and to a vehicle incorporating the intake system. More particularly, the present invention relates to an intake system including an air cleaner housing having at least one wall thereof formed with a stepped surface, and to an engine and a vehicle incorporating the same.

2. Description of the Background Art

There are several known intake systems for internal combustion engines. One example of an intake system, in which a number of noise absorbing members are arranged inside an intake muffler for reducing intake noises, is disclosed in Japanese Published Patent Document JP-A-62-255565. According to Japanese Published Patent Document JP-A-62-255565, as shown in FIG. 1 and FIG. 3 thereof, a muffler element 4, which performs a sound-absorbing function, is formed on one end portion of an intake muffler 3, and a filter element 9 which cleans (purifies) air is formed on another end portion of the intake muffler 3. The muffler element 4 includes a casing 18, a casing lid 19 which closes an opening formed in the casing 18, and three foamed-resin-made plates 13, 14, 15 arranged inside the casing 18 and the casing lid 19.

Another example of an intake system, in which plural diaphragms are arranged inside an air cleaner casing for reducing intake noises, is disclosed in the Japanese Published Patent Document JP-A-9-32667. According to Japanese Published Patent Document JP-A-9-32667, as shown in FIG. 1 and FIG. 2 thereof, an element 6 which is mounted on a mating portion of an air cleaner casing 5, and diaphragms 7*a,* 7*b*, which are mounted on a frame 6*a of the element* 6 such that the diaphragms 7*a,* 7*b* face upper and lower surfaces of the element 6 in an opposed manner with a distance defined therebetween, are stored in the air cleaner casing 5.

When the resin plates (foam plates) 13, 14, 15 are arranged inside the intake muffler 3 of the Japanese Patent Document JP-A-62-255565; or when the diaphragms 7*a,* 7*b* are arranged inside the air cleaner casing 5 of the Japanese Patent Document JP-A-9-32667, a number of components required for the intake system is required to be disadvantageously increased. Such increase in number of components has a drawback, because such increased number of components results in the intake system being large and complicated, and/or a weight of the intake system may be increased.

The present invention has been made to overcome such drawbacks of existing intake systems. Accordingly, it is one of the objects of the present invention to achieve a compact size of, and a reduction in weight of an intake system by reducing the number of components required for forming an intake system.

SUMMARY OF THE INVENTION

In order to achieve the above objects, the present invention according to a first aspect thereof provides an intake system for an engine of a vehicle. The intake system includes an air cleaner for cleaning air supplied to the engine. The air cleaner includes a housing having a plurality of walls, and a stepped surface is formed on least one of the plural walls thereof. The intake system is characterized in that the stepped surface includes an inner step, and an outer step arranged on a periphery of the inner step provided on the at least one of the plural walls.

According such configuration of the air cleaner, i.e., the stepped surface being provided on the wall, areas of the respective surface portions can be made small, and at the same time, the wall is formed into a stereoscopic shape having reinforcing ribs integrated into the structure thereof, thereby enhancing the rigidity of the wall. Accordingly, the resonance of the wall can be suppressed, so that it is possible to reduce intake noises.

It is sufficient to provide the stepped surface on only one of the wall of the air cleaner. Hence, it is not necessary to particularly add one or more components to the intake system for reducing intake noises.

The present invention according to a second aspect thereof, in addition to the first aspect, is characterized in that an edge is formed on each boundary between the respective steps of the stepped surface, and neighboring edges are formed in a non-parallel manner, i.e., the neighboring edges are formed such that they are not parallel to each other.

Accordingly, since widths of respective steps are made different from each other corresponding to portions of respective steps, a natural frequency of the wall is changed depending on portions of the wall. Therefore, during operation of the intake system, the wall is unlikely to resonate as a whole, thereby effectively reducing sounds as compared to a flat wall portion.

The present invention according to a third aspect thereof, in addition to one of the first and the second aspects, is characterized in that a surface of each step of the stepped surface has a curved surface.

According to the third aspect of the present invention, the wall can have a more dense (complicated) stereoscopic shape. Hence, the rigidity of the wall can be further enhanced, thereby additionally suppressing the resonance of the wall.

The present invention according to a fourth aspect thereof, in addition to one of the first through third aspects, is characterized in that the air cleaner includes an air cleaner body having an opening formed therein, and an air cleaner cover which closes an opening of the air cleaner body. The air cleaner cover has a duct fitting hole formed therein on a rear end portion (one-longitudinal-end-portion or a first end portion) thereof. The duct fitting hole receives an intake duct for supplying air to the cleaner.

The present invention according to the fourth aspect thereof is further characterized in that the stepped surface is formed on the air cleaner cover, and an edge which is formed on a boundary between an uppermost step of the stepped surface and a step which is arranged adjacent to the uppermost step is formed of edges which are formed in a tapered shape toward a front end portion (an other-longitudinal-end-portion or a second end portion) of the air cleaner cover so that the edges on the other-longitudinal-end-portion side of the air cleaner cover are formed in a non-parallel manner.

According to the fourth aspect of the present invention, since the stepped surface is provided to the air cleaner cover, the air cleaner cover can have a more dense (complicated)

stereoscopic shape thereby enhancing the rigidity of the air cleaner cover. Accordingly, the resonance of the air cleaner is hardly generated.

Further, since the edges of the air cleaner cover are formed in a non-parallel manner, a natural frequency of the stepped surface of the air cleaner cover varies depending on portions of the respective steps, whereby the air cleaner cover is unlikely to resonate as a whole to generate sound.

ADVANTAGES OF THE INVENTION

According to the first aspect of the present invention, the stepped surface formed in a stepwise manner such that the outer step is arranged on the periphery of the inner step provided to at least one wall of the air cleaner. Therefore, by providing the stepped surface to the wall, areas of the respective surface portions can be made small. At the same time, the wall can be formed into a stereoscopic shape thereby enhancing the rigidity thereof.

Accordingly, the resonance of the wall can be suppressed. Hence, it is possible to reduce intake noises. Also, it is possible to reduce the intake noises by merely providing the stepped surface to the wall of the air cleaner without increasing the number of components required for the intake system. Hence, a compact size of, and a reduction of weight of the air cleaner can be achieved.

According to the second aspect of the present invention, the edge is formed on each boundary between the respective steps of the stepped surface, and the neighboring edges are formed in a non-parallel manner. Hence, a width of each step is not set to a constant value. Accordingly, the natural frequencies of the respective steps varies (are changed) depending on portions of the respective steps. Also, the resonance of the wall is hardly generated as a whole thereby further effectively reducing sound. Therefore, it is possible to further reduce intake noises.

According to the third aspect of the present invention, the surface of each step of the stepped surface has the curved surface. Hence, the wall can be formed into a further dense (complicated) stereoscopic shape thereby enhancing the rigidity thereof. Accordingly, it is possible to further reduce intake noises.

According to the fourth aspect of the present invention, the air cleaner includes the air cleaner body and the air cleaner cover which closes the opening of the air cleaner body, the duct fitting hole in which the intake duct for taking air into the air cleaner is fitted is formed on a rear end portion (one-longitudinal-end-portion) of the air cleaner cover, the stepped surface is formed on the air cleaner cover, and the edge which is formed on the boundary between the uppermost step of the stepped surface and the step which is arranged adjacent to the uppermost step is formed of edges which are formed in a tapered shape toward the front end portion (other-longitudinal-end-portion) of the air cleaner cover such that the edges on the front end portion of the air cleaner cover are formed in a non-parallel manner.

Accordingly, due to the provision of the stepped surface, the air cleaner cover can be formed into a further dense stereoscopic shape thereby enhancing the rigidity of the air cleaner cover. As a result, the resonance of the air cleaner cover is hardly generated.

Further, the edges of the air cleaner cover are formed in a non-parallel manner. Hence, the natural frequency of the stepped surface of the air cleaner cover can be changed depending on the portions of the respective steps whereby the resonance of the air cleaner cover is hardly generated as a whole. Accordingly, it is possible to reduce intake noises of the air cleaner.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 5A is an explanatory top plan view of the air cleaner cover of FIG. 4.

FIG. 5B is an explanatory side view of the air cleaner cover according to the present invention.

DETAILED DESCRIPTION OF ILLUSTRATIVE EMBODIMENTS

A number of illustrative embodiments of the present invention will now be described, with reference to the drawings. Throughout this description, relative terms like “upper”, “lower”, “above”, “below”, “front”, “back”, and the like are used in reference to a vantage point of an operator of the vehicle, seated on the driver's seat and facing forward. It should be understood that these terms are used for purposes of illustration, and are not intended to limit the invention. Here, the drawings are viewed in the direction of numerals.

Figure 1:
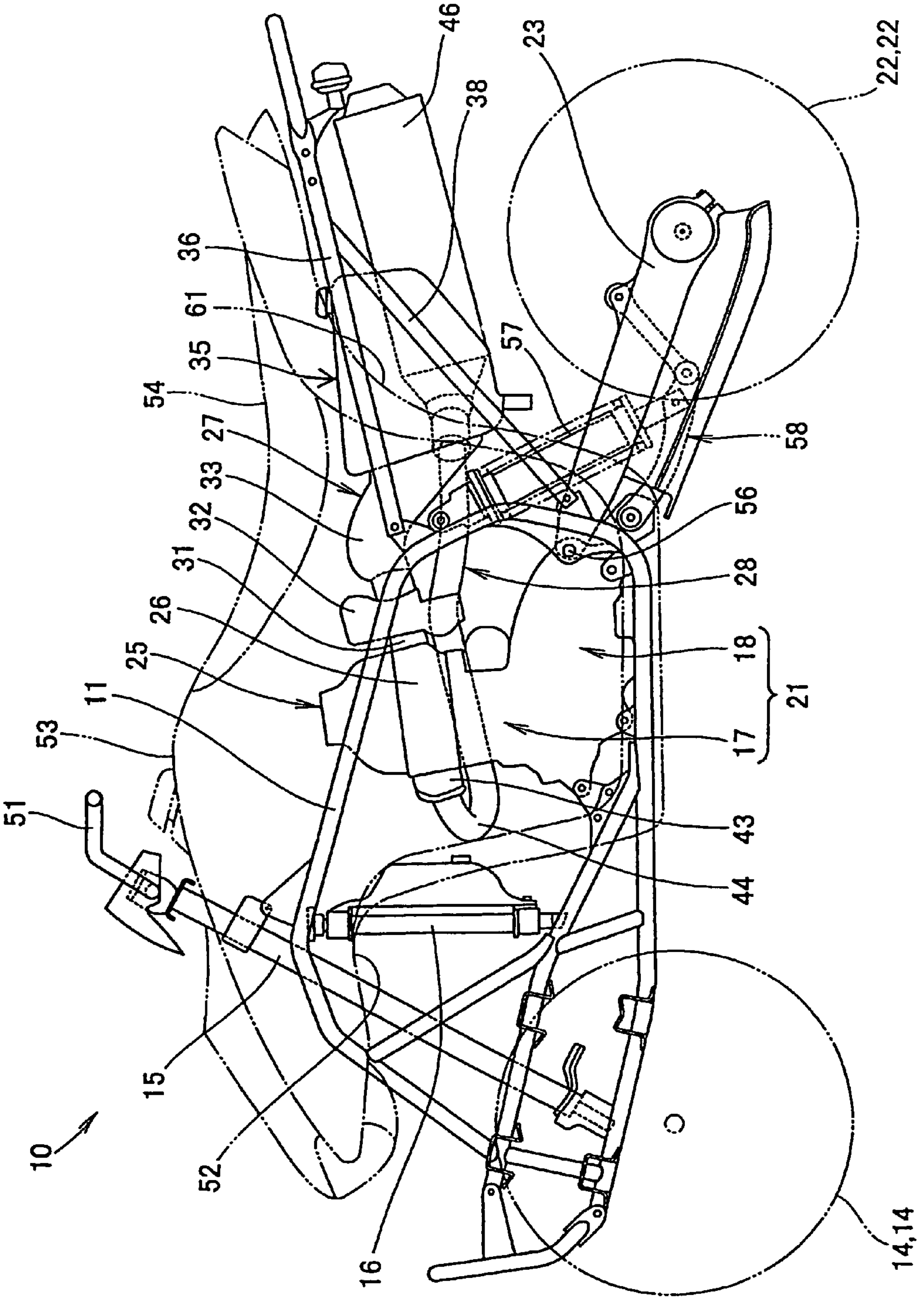
FIG. 1 is a side view of a vehicle including an intake system according to a selected illustrated embodiment of the present invention.

FIG. 1 is a side view of a vehicle 10 having an intake system according to the present invention. The vehicle 10 is an all terrain vehicle. The vehicle 10 includes a steering shaft 15 for steering a pair of left and right front wheels 14, 14, and a radiator 16 mounted on a front portion of a vehicle-body frame 11. A power unit 21 is mounted on a center portion of the vehicle-body frame 11. The power unit 21 includes an engine 17 and a transmission 18. A swing arm 23 which supports a pair of left and right rear wheels 22, 22 is swingably mounted on a rear portion of the vehicle-body frame 11.

An intake system 27 is connected to a cylinder portion 25 which is mounted on the engine 17, i.e., the intake system 27 is connected to a rear portion of a cylinder head 26 which is mounted on the cylinder portion 25. An exhaust system 28 is connected to a front portion of the cylinder head 26.

The intake system 27 includes an intake manifold 31 mounted on a rear portion of the cylinder head 26, a carburetor 32 connected to the intake manifold 31, and an air cleaner 35 connected to the carburetor 32 using a connecting tube 33.

The air cleaner 35 is arranged between a pair of left and right seat rails 36, 37 (only a left seat rail 36 on a viewer's side is seen in FIG. 1) which forms a part of the vehicle-body frame 11, and between a pair of left and right sub frames 38, 41 (only a left sub frame 38 on a viewer's side is seen in FIG. 1). The air cleaner 35 includes a hollow air cleaner housing 34 having a porous filter element (not shown) disposed therein for filtering incoming intake air.

The exhaust system 28 includes an exhaust manifold 43 mounted on a rear portion of the cylinder head 26, an exhaust pipe 44 connected to the exhaust manifold 43, and a muffler 46 connected to a rear end of the exhaust pipe 44.

The vehicle also includes a handlebar 51 mounted on an upper end of the steering shaft 15, a front fender 52 which covers the front wheel 14 from above, a body cover 53, a seat 54, a rear fender 61 which covers the rear wheel 22 from above, and a swing shaft 56 of the swing arm 23. The vehicle also includes a rear shock absorber 57 having an upper end which is mounted on a rear upper portion of the vehicle-body frame 11. A lower end of the shock absorber 57 is mounted on a rear lower portion of the vehicle-body frame 11 and the swing arm 23, using a link mechanism 58.

Figure 2:
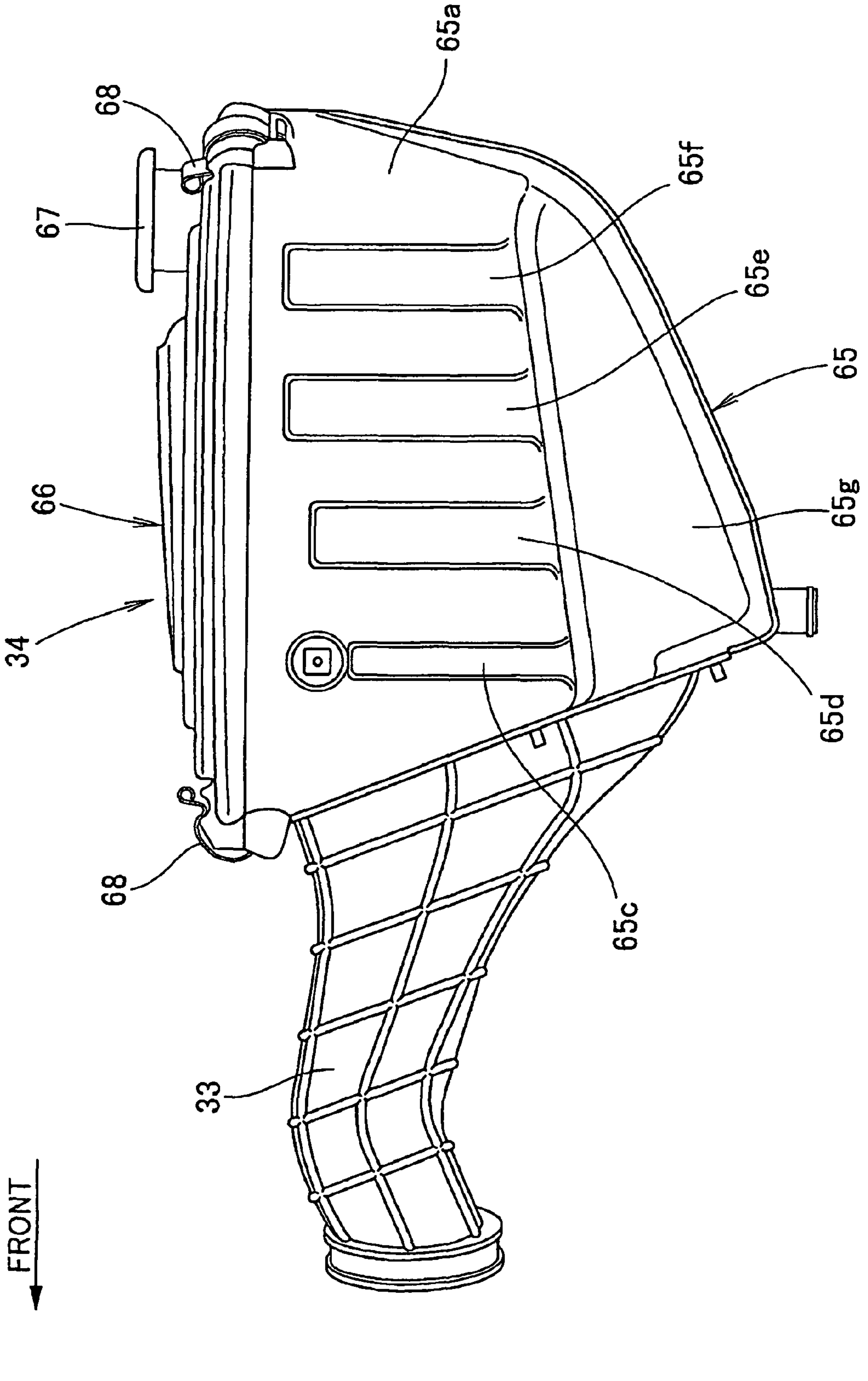
FIG. 2 is a side view showing an air cleaner housing according to the present invention.

FIG. 2 is a side view showing the air cleaner housing 34 according to the present invention. An arrow (FRONT) in the drawings indicates a front side of the vehicle 10 (see FIG. 1) on which the air cleaner housing 34 is arranged. As shown in FIG. 2, the air cleaner housing 34 is arranged such that the connecting tube 33 is connected to a front portion of the air cleaner housing 34. Incoming intake air is directed into the air cleaner housing 34 via an intake duct 67 located at an upper rear portion of the air cleaner, as shown. It will be understood that the air cleaner housing 24 houses a replaceable air cleaner element (not shown) therein for filtering incoming intake air passing therethrough.

The air cleaner housing 34 includes an air cleaner body 65 to which the connecting tube 33 is connected, an air cleaner cover 66 for closing an upper opening of the air cleaner body 65, and the intake duct 67 extending upwardly from a rear portion of the air cleaner cover 66. A plurality of releasable clamp members 68 are respectively pivotally mounted on the air cleaner body 65, as shown, for fixing the air cleaner cover 66 to the air cleaner body 65.

On both the side walls 65*a*, 65*b* (the side wall 65*a* on a viewer's side is seen in FIG. 2) of the air cleaner body 65, a plurality of longitudinally-elongated upper recessed portions 65*c*, 65*d*, 65*e*, 65*f*, and a lower recessed portion 65*g* having a depth greater than depths of the respective upper recessed portions 65*c* to 65*f* are respectively formed.

Due to the formation of the respective upper recessed portions 65*c*, 65*d*, 65*e*, 65*f* and the lower recessed portion 65*g*, the rigidity of the side walls 65*a*, 65*b* of the air cleaner body 65, having a large area, can be enhanced. Hence, it is possible to suppress sonic resonance of the side walls 65*a*, 65*b* thus realizing the reduction of intake noises.

Figure 3:
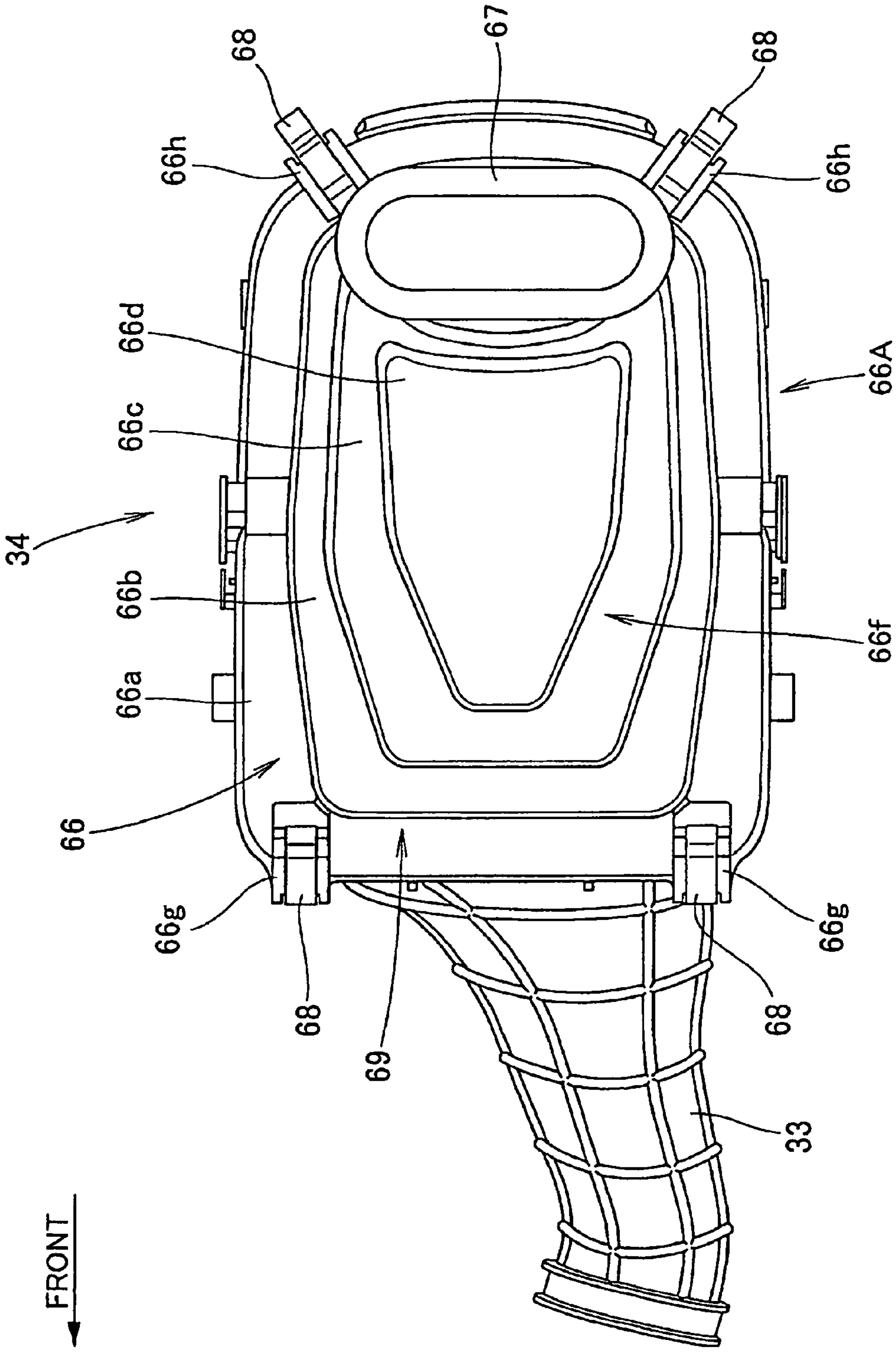
FIG. 3 is a top plan view showing the air cleaner housing according to the present invention.

FIG. 3 is a top plan view showing the air cleaner housing 34 according to the present invention. The air cleaner cover 66 is configured such that a stepped surface 66*f*, which includes a plurality of step faces ranging from a first step face 66*a* to a fourth step face 66*d*, is formed on an upper surface 66A of the air cleaner cover 66, i.e., the first step surface 66*a*, a second stepped surface 66*b*, a third stepped surface and the fourth stepped surface 66*d* are integrally formed on an upper surface 66A of the air cleaner cover 66.

Due to such arrangement of the stepped surfaces 66*a*, 66*b*, 66*c* and 66*d*, the rigidity of the air cleaner cover 66 can be enhanced.

As previously noted, the intake duct 67 is mounted on a rear portion of the air cleaner cover 66. Clamp member suspension portions 66*g*, 66*g*, 66*h*, 66*h* are integrally formed on four upper corners of the air cleaner cover 66, to allow the clamp members 68 to be engaged therewith at the time of fixing the air cleaner cover 66 to the air cleaner body 65 (see FIG. 2).

As has been explained in conjunction with FIGS. 1 and 3, in the vehicle 10 including the air cleaner housing 34 for cleaning air supplied to the engine 17, the stepped surface 66*f* formed in a stepwise manner having the outer step arranged on the periphery of the inner step is provided on an upper wall 69. The upper wall 69 constitutes at least one wall of the air cleaner housing 34.

Accordingly, by providing the stepped surface 66*f* to the upper wall 69, areas of the first through fourth step faces 66*a*, 66*b*, 66*c*, 66*d* which constitute surface portions respectively, can be made small. At the same time, the upper wall 69 can be formed into a stereoscopic shape having side walls 76, 77, 78, 79 (see FIG. 6) which function as reinforcing ribs. Accordingly, the rigidity of the upper wall 69 is enhanced. Hence, the resonance of the upper wall 69 can be suppressed thus reducing intake noises.

It is possible to reduce intake noises by merely providing the stepped surface 66*f* to the upper wall 69 of the air cleaner housing 34 without increasing the number of parts. Hence, the miniaturization and the reduction of weight of the air cleaner housing 34 can be realized.

Figure 4:
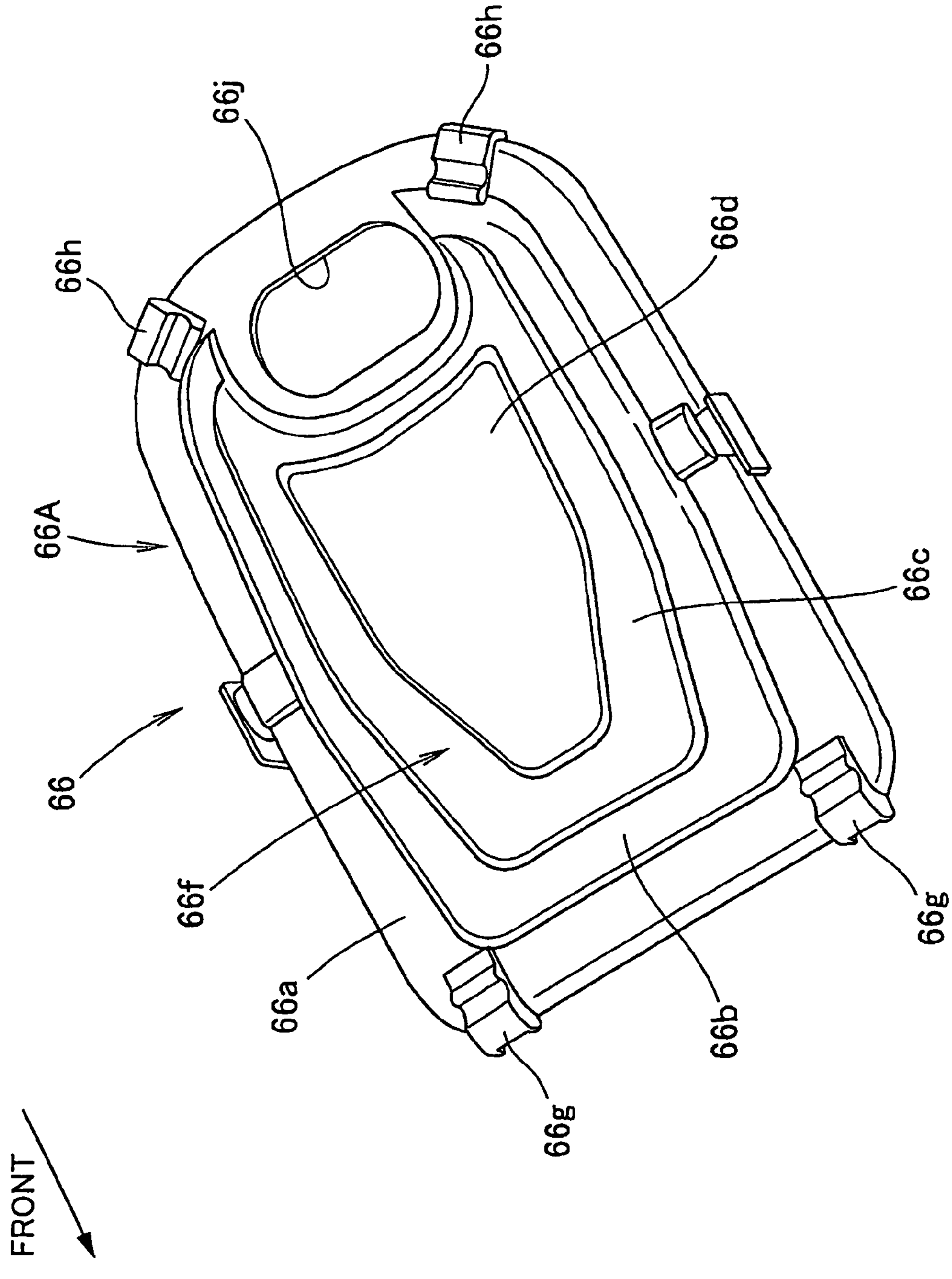
FIG. 4 is a perspective view of an air cleaner cover which is one component of the air cleaner housing according to the present invention.

FIG. 4 is a perspective view of the air cleaner cover according to the present invention. The stepped surface 66*f* includes the first step face 66*a* which is formed on a periphery of the upper surface 66A of the air cleaner cover 66, the second step face 66*b* which is formed on an inner side of the first step face 66*a* such that the second step face 66*b* is surrounded by the first step face 66*a* and is arranged higher than the first step face 66*a* by one step, the third step face 66*c* which is formed on an inner side of the second step face 66*b* such that a most portion of the third step face 66*c* is surrounded by the second step face 66*b* and is arranged higher than the second step face 66*b* by one step, and the fourth step face 66*d* which is formed on an inner side of the third step face 66*c* such that the fourth step face 66*d* is surrounded by the third step face 66*c* and is arranged higher than the third step face 66*c* by one step. Out of these step faces, the fourth step face 66*d* is arranged at the highest position.

On the first step face 66*a*, the clamp member suspending portions 66*g*, 66*g*, 66*h*, 66*h* are formed.

A rear end portion of the second step face 66*b* is cut off by the first step face 66*a* because of a duct fitting hole 66*j* used for mounting the intake duct 67 on a rear portion of the first step face 66*a*. Accordingly, a rear end portion of the third step face 66*c* is not surrounded by the second step face 66*b* and is arranged adjacent to the first step face 66*a*.

The fourth step face 66*d* is inclined in such a state that left and right edge portions of the fourth step face 66*d* on a front portion side become closer to each other corresponding to extending of the left and right edge portions toward a front-end-portion side of the fourth step face 66*d*.

FIG. 5A and FIG. 5B are explanatory views of the air cleaner cover according to the present invention.

FIG. 5A is a plan view, wherein a first edge 66*k* is formed on a boundary between the first step face 66*a* and the second step face 66*b*, a second edge 66*m* is formed on a boundary between the second step face 66*b* and the third step face 66*c*, and a third edge 66*n* is formed on a boundary between the third step face 66*c* and the fourth step face 66*e*.

For example, assuming edges which constitute front-side portions of the respective edges 66*k*, 66*m* and 66*n* as edges 66*p*, 66*q* and 66*r*, an angle which is made by an edge surface 66*s* of the first step face 66*a* and the edge 66*p* is set to $\theta 1$ ($\neq 0$), an angle formed which is made by the edge 66*p* and the edge 66*q* is set to $\theta 2(\neq 0)$, and an angle which is made by the edge 66*q* and the edge 66*r* is set to $\theta 3(\neq 0)$.

In other words, the edge surface 66*s* and the edge 66*p* are formed in a non-parallel manner, the edge 66*p* and the edge 66*q* are formed in a non-parallel manner, and the edge 66*q* and the edge 66*r* are formed in a non-parallel manner.

Further, for example, assuming edges which are front-side portions of the respective edges 66*k*, 66*m* and 66*n* as edges 66*t*, 66*u* and 66*v*, these edges 66*t*, 66*u* and 66*v* and the edge surface 66*w* of the first step face 66*a* are formed in a non-parallel manner.

Two edges 66*r*, 66*v* are formed in a tapered shape such that a distance between two edges 66*r*, 66*v* are gradually narrowed as the respective edges 66*r*, 66*v* extend in the frontward direction.

As described above, the edge surface 66*s*, the edges 66*p*, 66*q* and 66*r* are formed in a non-parallel manner. In the same manner, the edge surface 66*w*, the edges 66*t*, 66*u* and 66*v* are formed in a non-parallel manner. Hence, a width of the first step face 66*a*, a width of the second step face 66*b*, a width of the third step face 66*c*, and a width of the fourth step face 66*d* can be changed corresponding to respective portions of the stepped surface 66*f*. Accordingly, the natural frequency, that is, the resonance frequency can be changed depending on respective portions of the stepped surface 66*f* whereby the resonance of the air cleaner cover 66 is hardly generated as a whole. As a result, intake noises of the air cleaner housing 34 (see FIG. 3) can be reduced.

FIG. 5 B is a side view, wherein the first step face 66*a*, the second step face 66*b* and the third step face 66*c* are formed in a horizontal state or in a substantially horizontal state, and the fourth step face 66*d* is formed into an inclined surface which is inclined in the frontward and downward direction.

Figure 6:
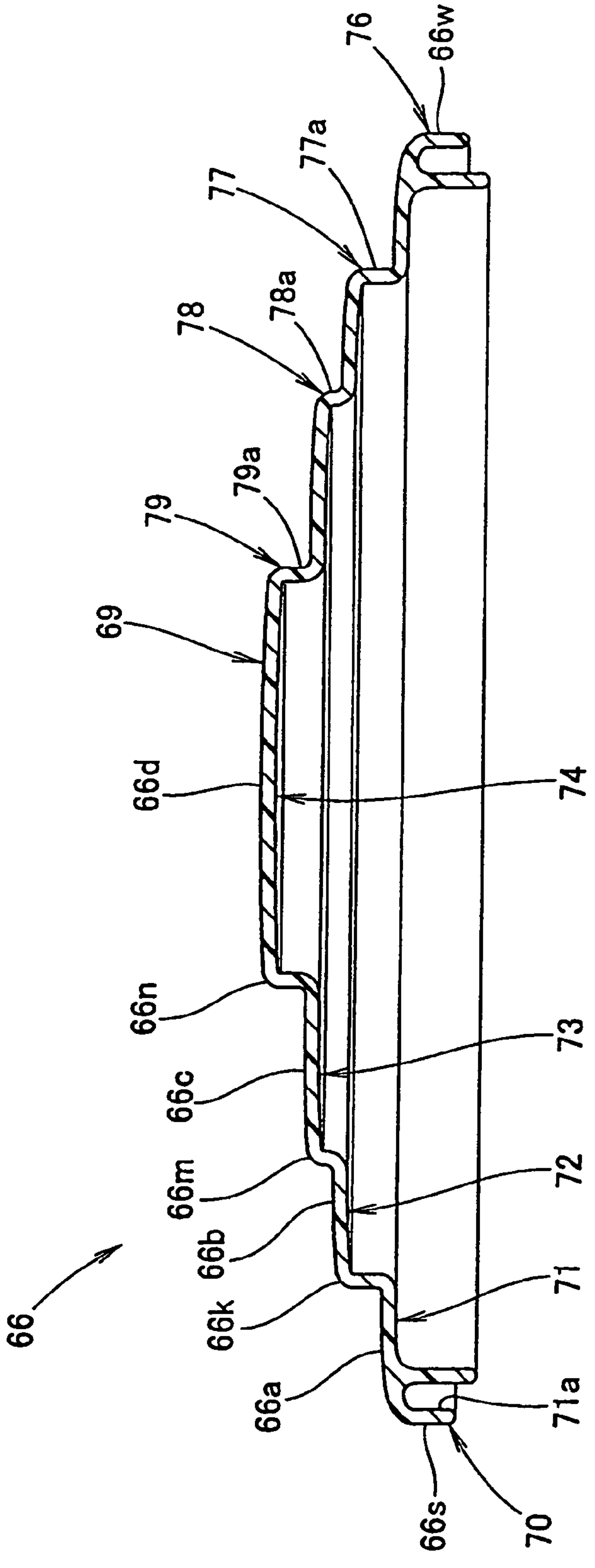
FIG. 6 is a cross-sectional view of the air cleaner cover, taken along a line 6-6 in FIG. 5A.

FIG. 6 is a cross-sectional view taken along a line 6-6 in FIG. 5A. As shown in FIG. 6, the air cleaner cover 66 includes the upper wall 69 and a peripheral wall 70 which extends in the downward direction from a periphery of the upper wall 69.

The upper wall 69 includes a first step portion 71 on which the first step face 66*a* is formed, a second step portion 72 on which the second step face 66*b* is formed, a third step portion 73 on which the third step face 66*c* is formed, and a fourth step portion 74 on which the fourth step face 66*d* is formed. Plate thicknesses of the respective first through fourth step portions 71, 72, 73 and 74 are set substantially equal to each other.

The first step portion 71 includes a first side wall 76, and the side surfaces of the first side wall 76 constitute the edge surfaces 66*s*, 66*w*.

The second step portion 72 includes a second side wall 77, and numeral 77*a* indicates a side surface of the second side wall 77.

The third step portion 73 includes a third side wall 78, and numeral 78*a* indicates a side surface of the third side wall 78.

The fourth step portion 74 includes a fourth side wall 79, and numeral 79*a* indicates a side surface of the fourth side wall 79.

One of first through fourth step faces 66*a*, 66*b*, 66*c* and 66*d* has a curved surface. The first step face 66*a* is formed into a shape in which the first step face 66*a* is gradually lowered in the direction from a second-step-face-66*b*-side proximal portion thereof to an edge surface 66*s* (or edge surface 66*w*) side thereof.

In a similar manner, the second step face 66*b* is formed in a shape in which the second step face 66*b* is gradually lowered in the direction from a third-step-face-66*c*-side proximal portion thereof to a second side wall 77 side thereof, the third step face 66*c* is formed in a shape in which the third step face 66*c* is gradually lowered in the direction from a fourth-step-face-66*d*-side proximal portion thereof to a third side wall 78 side thereof, and the fourth step face 66*d* is formed in a shape in which the fourth step face 66*d* is gradually lowered in the direction from a center side thereof to a fourth side wall 79 side thereof.

A fitting recessed portion 71*a* is formed on a peripheral portion of a lower surface of the first step portion 71 for allowing fitting of the air cleaner cover 66 on the air cleaner body 65.

As described above, the first through step faces 66*a*, 66*b*, 66*c* and 66*d*, respectively have the curved surface. Hence, the air cleaner cover 66 can have a stereoscopic shape having more concaves and convexes thereby further enhancing the rigidity of the air cleaner cover 66.

Further, the second side wall 77, the third side wall 78 and the fourth side wall 79 are arranged in a non-parallel manner when the air cleaner cover 66 is viewed in a plan view.

Figure 7:
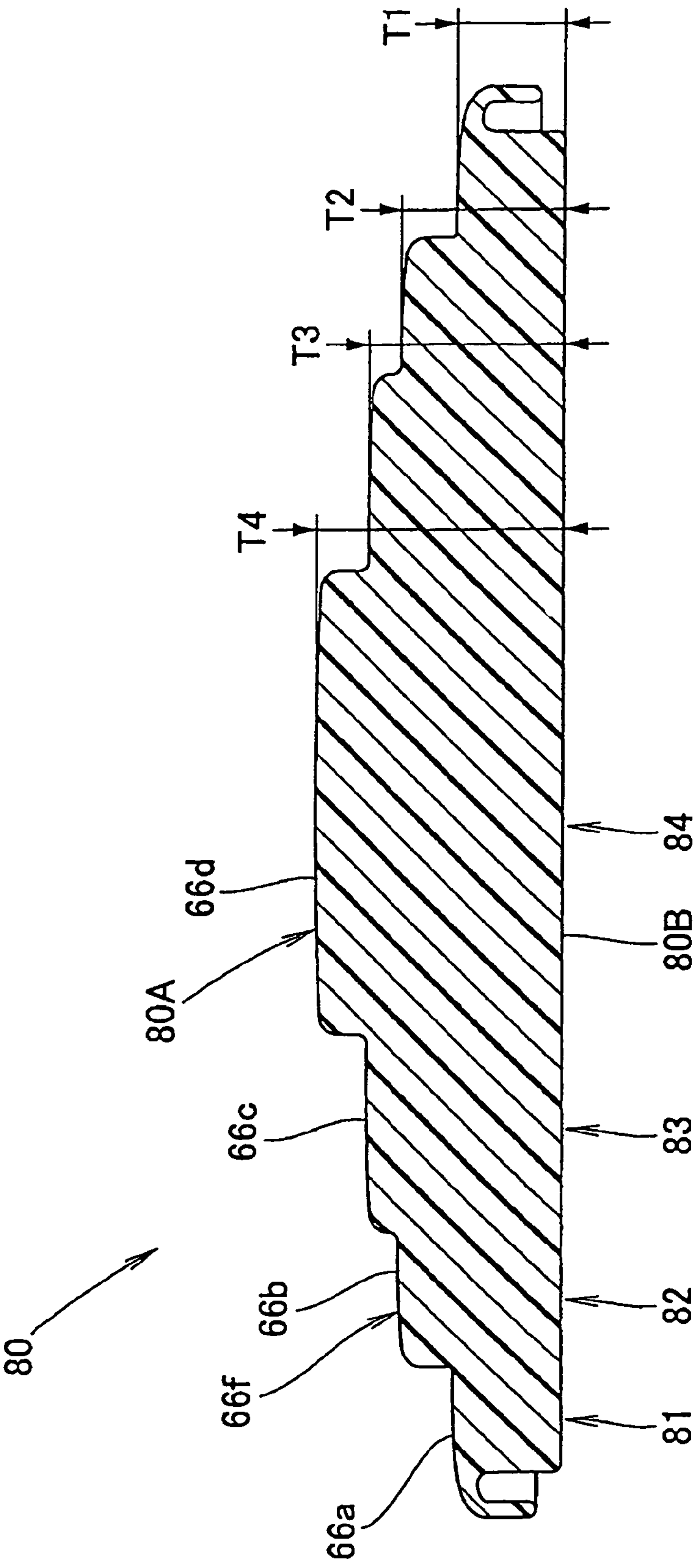
FIG. 7 is a cross-sectional view showing another embodiment of the air cleaner cover according to the present invention.

FIG. 7 is a cross-sectional view showing another embodiment of the air cleaner cover according to the present invention.

An air cleaner cover 80 is a resin-made. A stepped surface 66*f* is formed on an upper surface 80A of the air cleaner cover 80, and a lower surface 80B of the air cleaner cover 80 is made flat. Further, the air cleaner cover 80 includes a first step portion 81 on which a first step face 66*a* is formed, a second step portion 82 on which a second step face 66*b* is formed, a third step portion 83 on which a third step face 66*c* is formed, and a fourth step portion 84 on which a fourth step face 66*d* is formed.

Assuming a maximum plate thickness of the first step portion 81 as T1, a maximum plate thickness of the second step portion 82 as T2, a maximum plate thickness of the third step portion 83 as T3, and a maximum plate thickness of the fourth step portion 84 as T4, a relationship of $T1<T2<T3<T4$ is established.

In this manner, with respect to the plate thicknesses of the respective portions of the air cleaner cover 80, by setting the plate thickness of the portion of the air cleaner cover 80 on a center side larger than the plate thickness of the portion of the air cleaner cover 80 on an edge portion side, it is possible to increase a weight of the air cleaner cover 80. Hence, the resonance of the air cleaner cover 80 is hardly generated.

As shown in FIG. 5A, the first edge 66*k*, the second edge 66*m* and the third edge 66*n* are respectively formed as edges in boundaries between the neighboring step faces among the first step face 66*a*, the second step face 66*b*, the third step face 66*c* and the fourth step face 66*d* which constitute respective steps of the stepped surface 66*f*. The neighboring edges (the first edge 66*k* and the second edge 66*m*, the second edge 66*m* and the third edge 66*n*) are formed in a non-parallel manner. Hence, respective widths of the first step face 66*a*, the second step face 66*b*, the third step face 66*c* and the fourth step face 66*d* are not set to fixed values.

Accordingly, the natural frequencies of the respective step portions (the first step portion 71, the second step portion 72, the third step portion 73 and the fourth step portion 74) are changed depending on respective portions of the stepped surface 66*f*. Hence, the resonance of the upper wall 69 is hardly generated as a whole thus further effectively reducing sounds whereby it is possible to further reduce intake noises.

Further, as shown in FIG. 6, the surfaces of the respective steps of the stepped surface 66*f* have a curved surface respectively. Hence, the upper wall 69 can be formed into a further complicated stereoscopic shape thus enhancing the rigidity of the upper wall 69. Accordingly, it is possible to further reduce intake noises.

Further, as shown in FIG. 2, FIG. 5A and FIG. 5B, the air cleaner housing 34 includes the air cleaner body 65 and the air cleaner cover 66 which closes the opening of the air cleaner body 65, the duct fitting hole 66*j* in which the intake duct 67 which takes air into the inside of the air cleaner housing 34 is fitted, is formed in a one-longitudinal-end-portion side of the air cleaner cover 66, and the stepped surface 66*f* is formed on the air cleaner cover 66.

The edge 66*n* which is formed on the boundary between the uppermost step of the stepped surface 66*f* (that is, the fourth step face 66*d*) and the step which is arranged adjacent to the uppermost step (that is, the third step face 66*c*) is formed of edges which are formed in a tapered shape toward an another-longitudinal-end-portion side of the air cleaner cover 66 so that the edges 66*r*, 66*v* on the another-longitudinal-end-portion side of the air cleaner cover 66 are formed in a non-parallel manner.

Accordingly, due to the provision of the stepped surface 66*f*, the air cleaner cover 66 can be formed into a further complicated stereoscopic shape thus enhancing the rigidity of the air cleaner cover 66. As a result, the resonance of the air cleaner cover 66 is hardly generated.

Further, the edges 66*p*, 66*q* and 66*r* of the air cleaner cover 66 are formed in a non-parallel manner. Similarly, the edges 66*t*, 66*u* and 66*v* of the air cleaner cover 66 are formed in a non-parallel manner. Hence, the natural frequency of the stepped surface 66*f* of the air cleaner cover 66 can be changed depending on the portions of the respective steps whereby the resonance of the air cleaner cover 66 can be more hardly generated as a whole.

Due to such a constitution, it is possible to reduce intake noises of the air cleaner housing 34.

Figure 8:
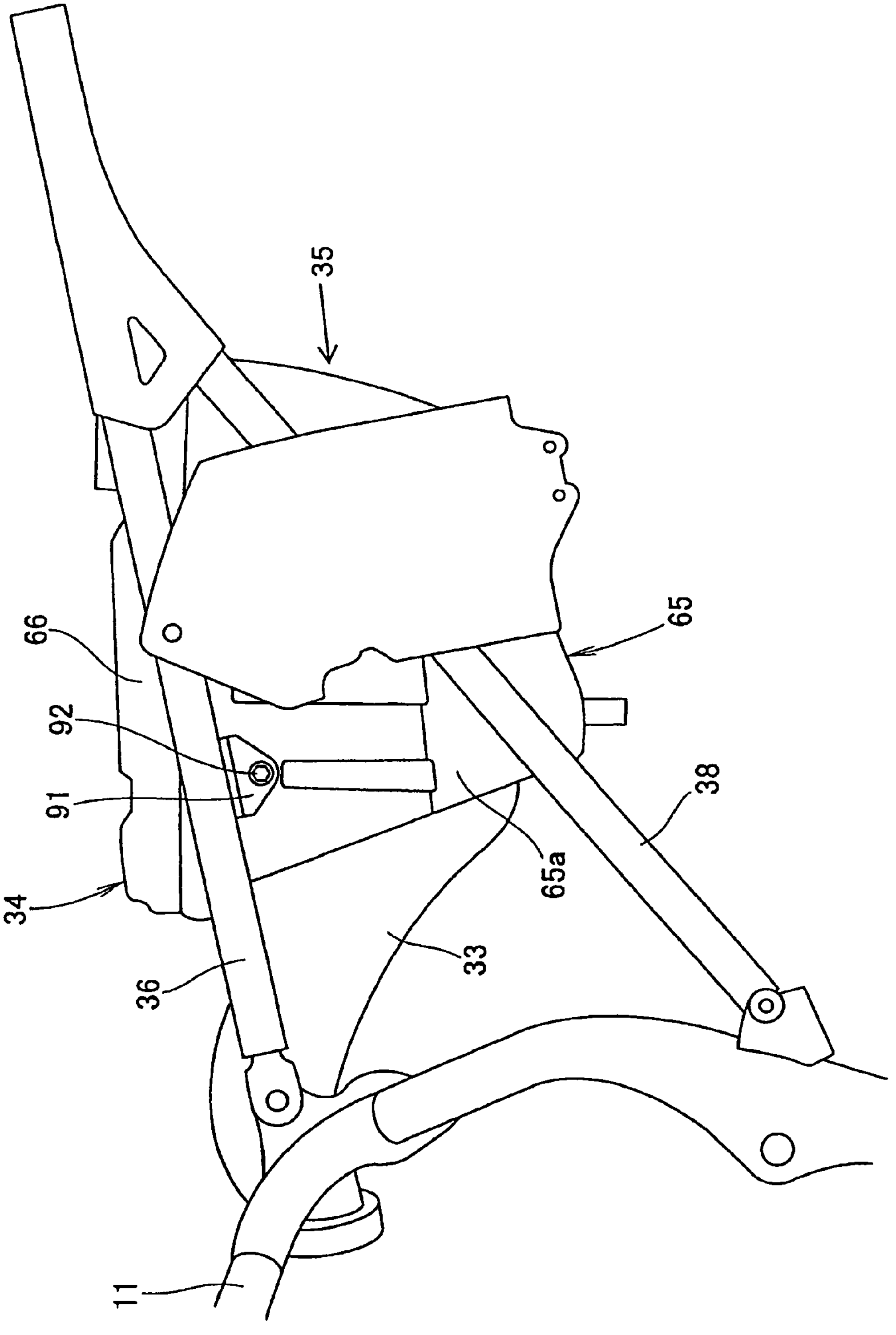
FIG. 8 is a rear left side view showing a mounting state of the air cleaner according to the present invention.

FIG. 8 is a rear left side view showing a mounting state of the air cleaner according to the present invention, wherein a left front bracket 91 is mounted on the left seat rail 36, and the side wall 65*a* of the air cleaner housing 34 is mounted on the left front bracket 91 using a bolt 92.

Figure 9:
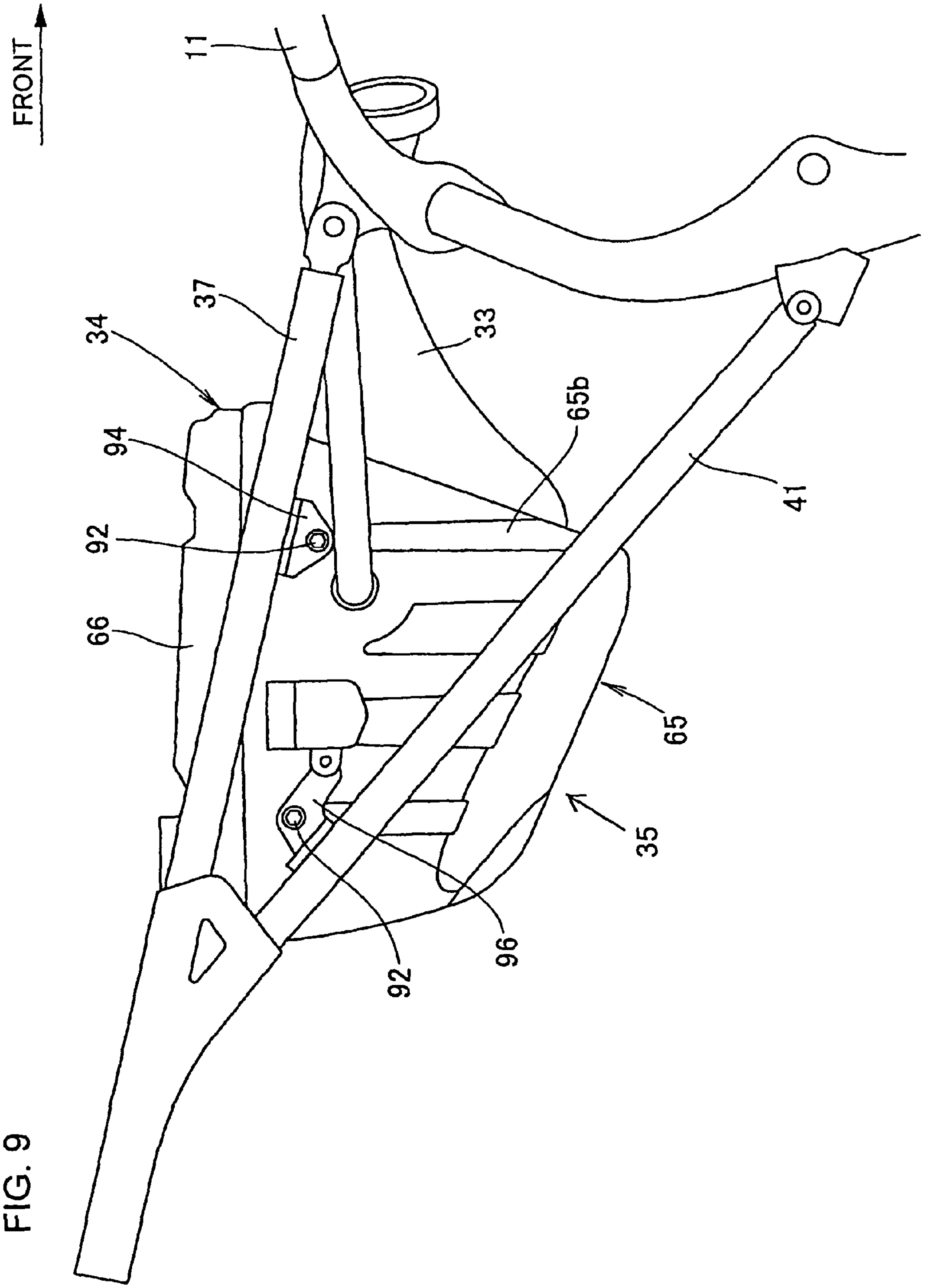
FIG. 9 is a rear right side view showing a mounting state of the air cleaner according to the present invention.

FIG. 9 is a rear right side view showing a mounting state of the air cleaner according to the present invention, wherein a right front bracket 94 is mounted on the right seat rail 37, a right rear bracket 96 is mounted on the right sub frame 41, and the side wall 65*b* of the air cleaner housing 34 is mounted on the right front bracket 94 and the right rear bracket 96 respectively using bolts 92.

Figure 10:
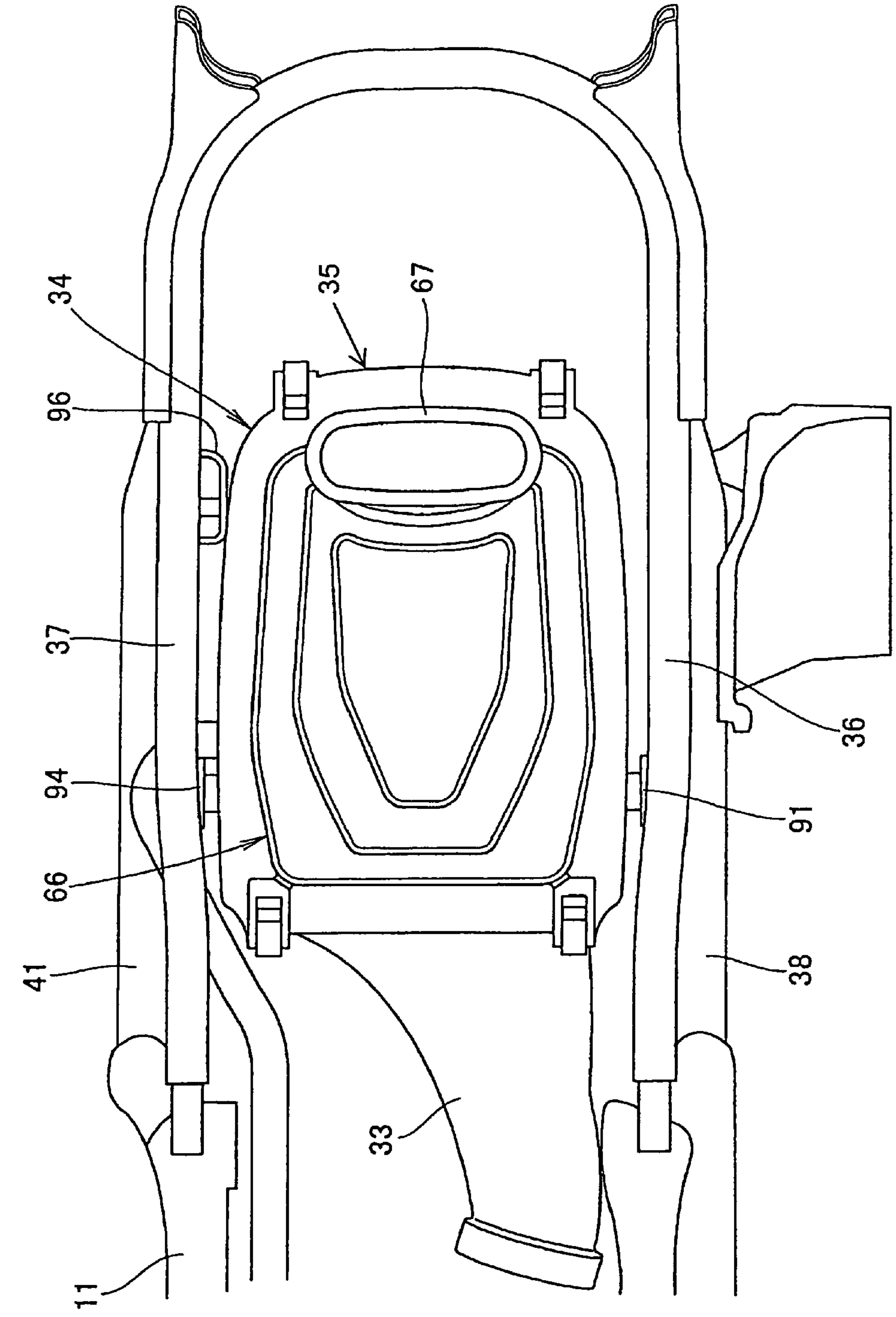
FIG. 10 is a rear plan view showing a mounting state of the air cleaner according to the present invention.

FIG. 10 is a rear plan view showing a mounting state of the air cleaner according to the present invention, wherein the air cleaner housing 34 is supported on the left and right seat rails 36, 37 and the right sub frame 41 in a three-point supporting manner.

In the illustrative embodiment, as shown in FIG. 3, the stepped surface 66*f* is formed on the air cleaner cover 66. However, the present invention is not limited to the above-mentioned configurations, and the stepped surface 66*f* may be formed on the air cleaner body 65, or the stepped surface 66*f* may be formed on both of the air cleaner body 65 and the air cleaner cover 66.

INDUSTRIAL APPLICABILITY

The intake system of the present invention is applicable to several types of vehicles, and preferably applicable to an all terrain vehicle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An intake system for an engine of a vehicle, said intake system comprising:

an air cleaner for cleaning air supplied to an engine; said air cleaner comprising an air cleaner housing having plural walls;

wherein a stepped surface is formed in a stepwise manner on least one of said plural walls, said stepped surface comprising an inner step having a first step face, and an outer step arranged on a periphery of the inner step and disposed at a different level from the inner step, the outer step including a second step face;

wherein said first step face is arranged above said second step face and has an inclined surface in a forward and downward direction such that said first step face and said second step face are formed in non-parallel manner; and wherein left and right edges of each of respective said first step face and said second step face are arranged closer to each other at a front end portion thereof in relation to left and right edges of each of respective said first step face and said second step face at a rear end thereof.

2. An intake system according to claim 1, wherein an edge is formed on each boundary between the respective steps of the stepped surface, and wherein neighboring edges are formed in a non-parallel manner.

3. An intake system according to claim 1, wherein a surface of each of said steps of the stepped surface has a curved surface.

4. An intake system according to claim 2, wherein a surface of each of said steps of the stepped surface has a curved surface.

5. An intake system according to claim 1, wherein the air cleaner comprises:

an air cleaner body having an opening formed therein; and an air cleaner cover for closing the opening of the air cleaner body; said air cleaner cover having a duct fitting hole formed therein at a first end portion thereof; said duct fitting hole receiving an intake duct for supplying air into the air cleaner;

wherein the stepped surface is formed on the air cleaner cover, and a perimeter edge which is formed on a boundary between an uppermost step of the stepped surface and a step which is arranged adjacent to the uppermost step is formed of edges which are formed in a tapered shape toward a second end portion of the air cleaner cover such that the edges on the second end portion of the air cleaner cover are formed in a non-parallel manner.

6. An intake system according to claim 2, wherein the air cleaner comprises:

an air cleaner body having an opening formed therein; and an air cleaner cover for closing the opening of the air cleaner body; said air cleaner cover having a duct fitting hole formed therein at a first end portion thereof; said duct fitting hole receiving an intake duct for supplying air into the air cleaner;

wherein the stepped surface is formed on the air cleaner cover, and a perimeter edge which is formed on a boundary between an uppermost step of the stepped surface and a step which is arranged adjacent to the uppermost step is formed of edges which are formed in a tapered shape toward a second end portion of the air cleaner cover such that the edges on the second end portion of the air cleaner cover are formed in a non-parallel manner.

7. An intake system according to claim 3, wherein the air cleaner comprises:

an air cleaner body having an opening formed therein; and an air cleaner cover for closing the opening of the air cleaner body; said air cleaner cover having a duct fitting hole formed therein at a first end portion thereof; said duct fitting hole receiving an intake duct for supplying air into the air cleaner;

wherein the stepped surface is formed on the air cleaner cover, and a perimeter edge which is formed on a boundary between an uppermost step of the stepped surface and a step which is arranged adjacent to the uppermost step is formed of edges which are formed in a tapered shape toward a second end portion of the air cleaner cover such that the edges on the second end portion of the air cleaner cover are formed in a non-parallel manner.

8. An intake system according to claim 4, wherein the air cleaner comprises:

an air cleaner body having an opening formed therein; and an air cleaner cover for closing the opening of the air cleaner body; said air cleaner cover having a duct fitting hole formed therein at a first end portion thereof; said duct fitting hole receiving an intake duct for supplying air into the air cleaner;

wherein the stepped surface is formed on the air cleaner cover, and a perimeter edge which is formed on a boundary between an uppermost step of the stepped surface and a step which is arranged adjacent to the uppermost step is formed of edges which are formed in a tapered shape toward a second end portion of the air cleaner cover such that the edges on the second end portion of the air cleaner cover are formed in a non-parallel manner.

9. A vehicle comprising an engine, and an intake system for providing air to said engine, said intake system comprising an air cleaner for cleaning air supplied to the engine, said air cleaner comprising an air cleaner housing comprising:

a bottom wall;

a top wall; and a plurality of side walls extending between said bottom wall and said top wall;

wherein said top wall comprises a plurality of steps including an inner step having a first step face, an intermediate step arranged on a periphery of the inner step, and an outer step having a second step face arranged on a periphery of the intermediate step; and wherein said first step face is arranged above said second step face and has an inclined surface in a forward and downward direction such that said first step face and said second step face are formed in non-parallel manner.

10. A vehicle according to claim 9, wherein a boundary is formed between each pair of adjacent steps of the top wall, and a perimeter edge is formed on each boundary between the respective steps of the top wall, wherein neighboring perimeter edges are not parallel to each other.

11. A vehicle according to claim 9, wherein each of said steps has a curved surface.

12. A vehicle according to claim 10, wherein each of said steps has a curved surface.

13. A vehicle according to claim 9, wherein said top wall is an air cleaner cover having a duct fitting hole formed therein at a first end portion thereof; said duct fitting hole receiving an intake duct for supplying air into the air cleaner;

wherein a perimeter edge formed on a boundary between an uppermost step of the plurality of steps and a step which is arranged adjacent to the uppermost step is formed of edges which are formed in a tapered shape toward a second end portion of the air cleaner cover such that the edges on the second end portion of the air cleaner cover are not parallel to each other.

14. A vehicle according to claim 10, wherein said top wall is an air cleaner cover having a duct fitting hole formed therein at a first end portion thereof; said duct fitting hole receiving an intake duct for supplying air into the air cleaner;

wherein a perimeter edge formed on a boundary between an uppermost step of the plurality of steps and a step which is arranged adjacent to the uppermost step is formed of edges which are formed in a tapered shape toward a second end portion of the air cleaner cover such that the edges on the second end portion of the air cleaner cover are not parallel to each other.

15. An air cleaner housing for use in a vehicle, said air cleaner housing comprising a plurality of walls connected with each other; one of said plurality of walls comprising a plurality of steps thereby forming an exterior stepped surface comprising an inner step having a first step face and an outer step having a second step face formed in a non-parallel manner with said first step face; wherein said first step face is arranged above said second step face and has an inclined surface in a forward and downward direction; wherein perimeter edges formed between adjacent steps are not parallel to each other and wherein each of said plurality of steps has a different width.

16. An air cleaner housing according to claim 15, wherein said one of the plurality of walls is a removable cover; and wherein a surface of each of said steps formed on the removable cover has a curved surface.

17. An air cleaner housing according to claim 16, wherein said removable cover has a duct fitting hole formed there at first end portion thereof; said duct fitting hole receiving an intake duct for supplying air to an air cleaner.

18. An air cleaner housing according to claim 16, when viewed in a side view, said removable cover is tapered in a longitudinal direction thereof.

19. An air cleaner housing according to claim 15, wherein said one of the plurality of walls is an upper wall; and wherein the air cleaner housing further comprises a side wall having a plurality of recessed portions formed thereon.

20. An air cleaner housing according to claim 15, wherein a height of an outermost step of said plurality of steps is less than a height of in innermost step of said plurality of steps.

* * * * *